United States Patent
Kim (10) Patent No.: US 9,807,820 B2
(45) Date of Patent: Oct. 31, 2017

(54) GATEWAY SYSTEM INCLUDING COMMUNICATION MODULE AND METHOD OF DRIVING THE SAME

(71) Applicant: LG INNOTEK CO., LTD., Seoul (KR)

(72) Inventor: Yull Oh Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 715 days.

(21) Appl. No.: 14/085,283

(22) Filed: Nov. 20, 2013

(65) Prior Publication Data
US 2014/0142730 A1    May 22, 2014

(30) Foreign Application Priority Data

Nov. 20, 2012  (KR) ........................ 10-2012-0131886

(51) Int. Cl.
| | | |
|---|---|---|
| *G06F 19/00* | (2011.01) | |
| *H04W 92/06* | (2009.01) | |
| *H05B 37/02* | (2006.01) | |
| *G08C 17/02* | (2006.01) | |

(52) U.S. Cl.
CPC ............ *H04W 92/06* (2013.01); *G08C 17/02* (2013.01); *H05B 37/02* (2013.01); *G08C 2201/40* (2013.01)

(58) Field of Classification Search
USPC ........................................................ 700/294
See application file for complete search history.

(56) References Cited

U.S. PATENT DOCUMENTS

| | | | |
|---|---|---|---|
| 6,765,991 B1* | 7/2004 | Hanuschak | H04L 12/66 379/37 |
| 9,363,573 B2* | 6/2016 | Kumar | H04N 21/4223 |
| 2003/0078990 A1* | 4/2003 | Lee | H04B 3/546 709/218 |
| 2004/0203387 A1* | 10/2004 | Grannan | G08C 17/00 455/41.2 |

(Continued)

FOREIGN PATENT DOCUMENTS

| | | |
|---|---|---|
| GB | 2427733 A | 1/2007 |
| JP | 2002-223281 A | 8/2002 |

(Continued)

OTHER PUBLICATIONS

Bian etal, The Nwe Intelligent Home Control System Based on the Dynamic and intelligent Gateway, 2011, Beijing Key laboratory of inteligent Telecommunication software and multimedia, p. 526-530.*

(Continued)

*Primary Examiner* — Kidest Bahta
(74) *Attorney, Agent, or Firm* — Saliwanchik, Lloyd & Eisenschenk (57) ABSTRACT

Disclosed are a gateway system for controlling at least one electronic appliance and a method of driving the same. The gateway system includes a gateway module to transmit a control signal to the electronic appliance by using a first wireless network; and at least one communication module detachably coupled to the gateway module to provide a second wireless network different from the first wireless network to the gateway module.

6 Claims, 8 Drawing Sheets

(56) References Cited

U.S. PATENT DOCUMENTS

| | | | |
|---|---|---|---|
| 2005/0194456 A1* | 9/2005 | Tessier | F24F 11/006 236/51 |
| 2006/0273817 A1 | 12/2006 | Hsieh et al. | |
| 2007/0152048 A1* | 7/2007 | Jung | G06Q 10/087 235/385 |
| 2007/0268360 A1 | 11/2007 | Ahlgren | |
| 2008/0011864 A1* | 1/2008 | Tessier | F24F 11/006 236/51 |
| 2008/0028430 A1 | 1/2008 | Kreiner et al. | |
| 2008/0064395 A1* | 3/2008 | Sibileau | G08C 17/02 455/433 |
| 2008/0074258 A1* | 3/2008 | Bennett, III | H04L 12/2818 340/541 |
| 2008/0120675 A1* | 5/2008 | Morad | H04N 7/17318 725/120 |
| 2008/0195299 A1* | 8/2008 | Barnicle | G08C 17/02 701/115 |
| 2009/0015433 A1 | 1/2009 | James et al. | |
| 2009/0157999 A1* | 6/2009 | Chen | G06F 13/1668 711/172 |
| 2010/0026512 A1 | 2/2010 | Wang | |
| 2010/0141153 A1* | 6/2010 | Recker | H05B 33/0803 315/149 |
| 2011/0264245 A1 | 10/2011 | Lim et al. | |

FOREIGN PATENT DOCUMENTS

| | | |
|---|---|---|
| JP | 2006-121149 A | 5/2006 |
| JP | 2006-340367 A | 12/2006 |
| JP | 2009-500886 A | 1/2009 |
| WO | WO-2007135598 A1 | 11/2007 |

OTHER PUBLICATIONS

European Search Report dated Jun. 2, 2016 in European Application No. 13193242.8.

Office Action dated Aug. 24, 2017 in Japanese Application No. 2013-237789, filed Nov. 28, 2013.

* cited by examiner

GATEWAY SYSTEM INCLUDING COMMUNICATION MODULE AND METHOD OF DRIVING THE SAME

CROSS-REFERENCE TO RELATED APPLICATION

This application claims the benefit under 35 U.S.C. §119 of Korean Patent Application No. 10-2012-0131886, filed Nov. 20, 2012, which is hereby incorporated by reference in its entirety.

BACKGROUND

The embodiment relates to a gateway system including a communication module and a method of driving the same.

In general, users manually manipulate a switch connected to a lighting apparatus through a cable in order to turn on or off the lighting apparatus. In this case, the patient, the senior citizen or the infirm who cannot move freely, or children who cannot reach the switch may feel inconvenience when turning on or off the lighting apparatus.

Recently, in order to solve the inconvenience, a lighting apparatus, which is turned on or turn off and can adjust lighting intensity by using a remote controller, has been launched in the market.

Further, a plurality lighting apparatuses may be controlled individually or simultaneously through the interwork with a home network system.

Meanwhile, as the lighting and communication markets have been diversified, the requirement for the selective control of the characteristics (color temperature, dimming value, or brightness) of the lighting apparatus, or the selection of a communication scheme based on the speed/distance/power consumption among various communication schemes such as ZigBee, WiFi, or Bluetooth is increased.

However, when a gateway system for a home network system supports a specific communication scheme, it is difficult to additionally support another communication scheme.

BRIEF SUMMARY

The embodiment provides a communication module detachably installed on a lighting apparatus.

According to the embodiment, there is provided a gateway system for controlling at least one electronic appliance. The gateway system includes a gateway module to transmit a control signal to the electronic appliance by using a first wireless network; and at least one communication module detachably coupled to the gateway module to provide a second wireless network different from the first wireless network to the gateway module.

According to the embodiment, there is a method of driving a gateway system to which a second wireless network, which is different from a first wireless network installed in a gateway module, is provided from a communication module detachably coupled to with the gateway module. The method includes receiving detaching information from an interface of the communication module; requesting information on the communication module; receiving the information on the communication module from the communication module; and controlling an external electronic appliance through the second wireless network.

According to the embodiment, the wireless communication module is detachably formed in the gateway, so that an additional communication scheme may be supported without exchange of any modules, resulting in cost down.

According to the embodiment, the detachable communication module can be employed, so that an electronic appliance may be controlled in various communication schemes according to the specification of the electronic appliance or a wireless controller.

According to the embodiment, since various wireless communication schemes (such as Zigbee, WiFi and Bluetooth) can be selectively implemented in the wireless communication part of the communication module, an optimal wireless communication scheme may be selected by taking into consideration a speed, a distance and a power consumption, so that the data reception, transmission and control may be performed.

According to the embodiment, a plurality of pins of the interface part of the communication module may be standardized to have specific order and use.

DETAILED DESCRIPTION

Hereinafter, embodiments will be described in detail with reference to accompanying drawings so that those skilled in the art can easily work with the embodiments. However, the embodiments may have various modifications. The thickness and size of each layer shown in the drawings may be exaggerated, omitted or schematically drawn for the purpose of convenience or clarity. In addition, the size of elements does not utterly reflect an actual size. The same reference numbers will be assigned the same elements throughout the drawings.

In the following description, when a predetermined part "includes" a predetermined component, the predetermined part does not exclude other components, but may further include other components if there is a specific opposite description.

The thickness of each layer shown in the drawings may be enlarged for the purpose of convenience or clarity. In addition, the size of elements does not utterly reflect an actual size. The same reference numbers will be assigned the same elements throughout the drawings. In the description of the embodiments, it will be understood that, when a layer, a film, a region or a plate is referred to as being "on" or "under" another layer, another film, another region, or another plate, it can be "directly" or "indirectly" on the other layer, film, region, plate, or one or more intervening layers may also be present. Such a position of the layer has been described with reference to the drawings.

The embodiment provides a home network system including a communication module detachably installed in a gateway.

Hereinafter, a lighting system will be described with reference to FIGS. 1 to 5.

Figure 1:
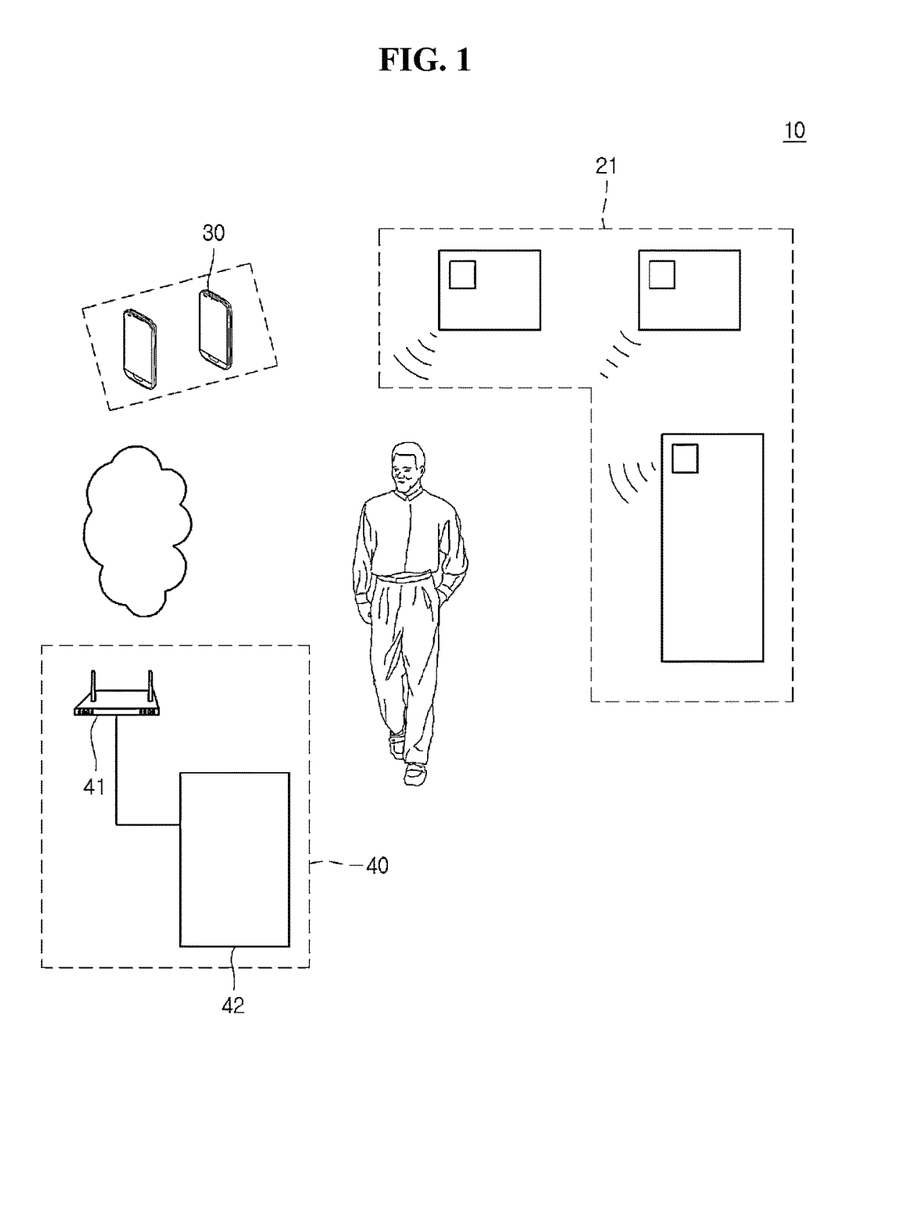
FIG. 1 is a view showing a configuration of a home network system according to the embodiment.
Figure 2:
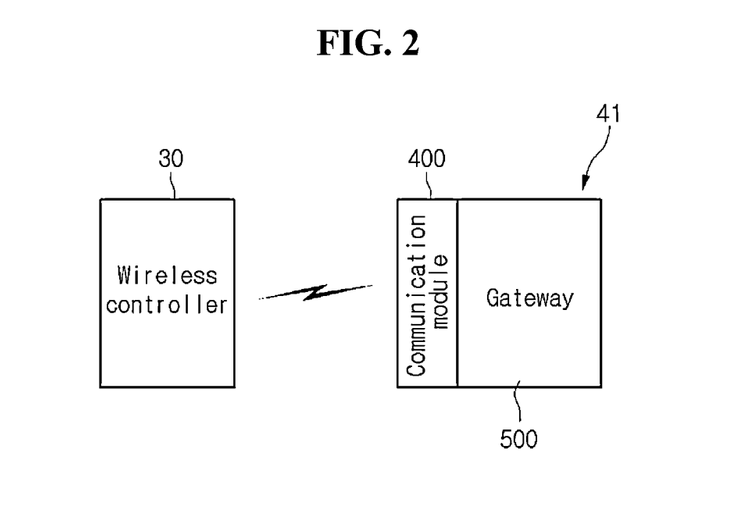
FIG. 2 is a block diagram illustrating a communication scheme of the gateway of FIG. 2.
Figure 3:
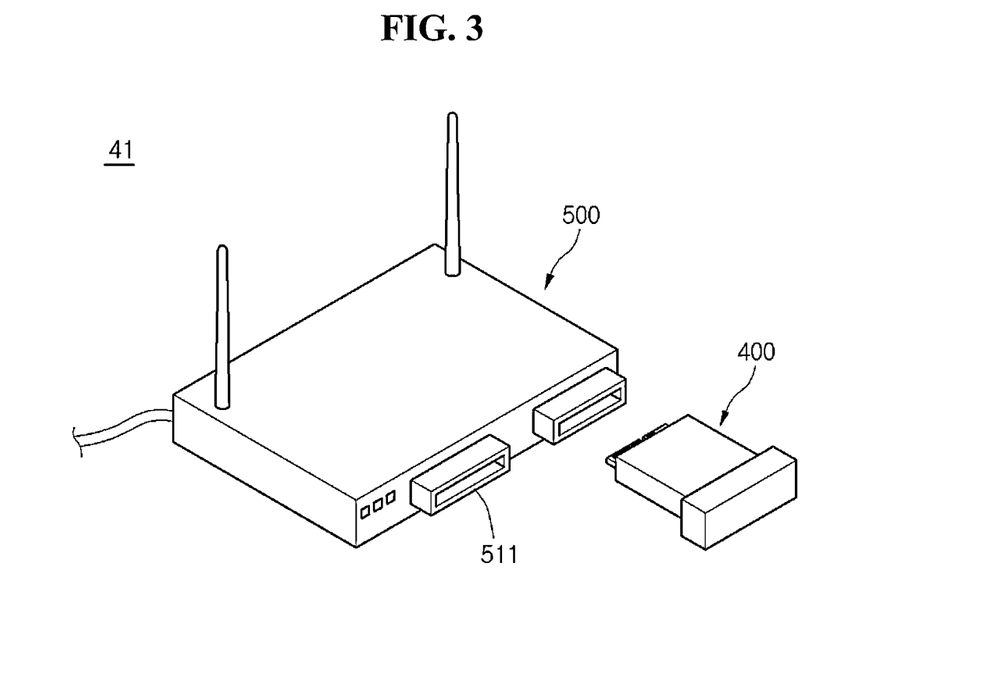
FIG. 3 is a perspective view showing the gateway of FIG. 2.
Figure 4:
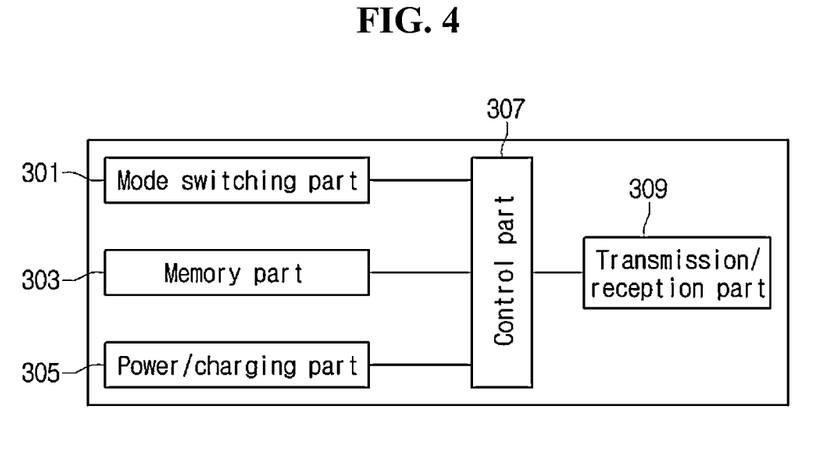
FIG. 4 is a block diagram showing a configuration of the wireless controller of FIG. 1.
Figure 5:
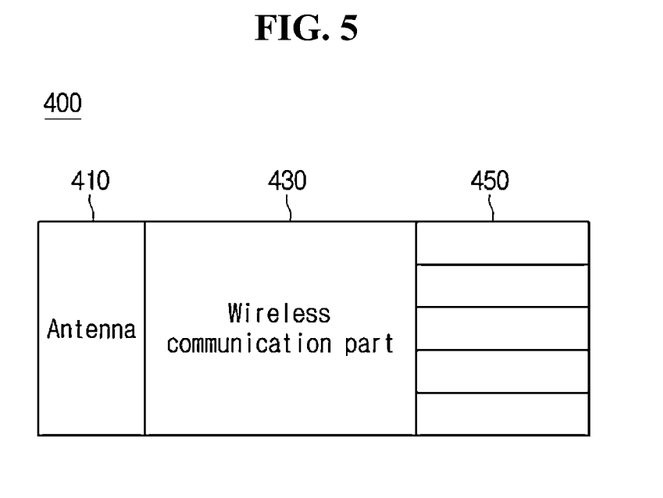
FIG. 5 is a block diagram showing a configuration of a communication module of FIG. 1.

FIG. 1 is a view showing a configuration of a home network system according to the embodiment. FIG. 2 is a block diagram illustrating a communication scheme of the gateway of FIG. 2. FIG. 3 is a perspective view showing the gateway of FIG. 2. FIG. 4 is a block diagram showing a configuration of the wireless controller of FIG. 1. FIG. 5 is a block diagram showing a configuration of a communication module of FIG. 1.

The home network system 10 includes a home gateway system 40 and a plurality of electronic appliances 21.

As shown in the drawings, the home gateway system 40 is connected to an external communication network and is connected to a wireless controller 30 and the electronic appliances 21 through an internal communication network.

The home gateway system 40 interfaces data transceived between the external communication network, the wireless controller 30 and the electronic appliances 21.

The embodiment may include at least one electronic appliance and three electronic appliances 21 are depicted in the drawings.

Although the wireless controller 30 may be a remote controller connected through the home gateway system 40 and a wireless network, the wireless controller 30 may include a portable terminal, such as a laptop computer or a smart phone.

The electronic appliance 21 may include various home electronic appliances having a network function, such as an Internet refrigerator, a digital TV or a set-top box, which may be access an external communication network, such as a high-speed communication network, in home, as well as typically, a telephone or a computer, as various multimedia services are provided.

Further, the electronic appliance 21 may include at least one lighting apparatus controlled by a dimming device connected to the home gateway system 40.

In addition, the electronic appliance 21 may include at least one sensor disposed in a home.

The wireless controller 30 and the electronic appliance 21 may connect with the home gateway system 40 through various types of networks, respectively.

In this case, various types of networks may transceive data through mutually different transmission bandwidths, and a wireless scheme, such as Zigbee, Bluetooth, Z-wave or WiFi, may be applied to the embodiment according to the coverage of the home gateway system 40.

As shown in FIG. 1, the home gateway system 40 includes a gateway 41 and a server 42.

The gateway 41 wirelessly controls the electronic appliance 21 through at least one wireless communication scheme in a home.

The server 42 may be connected to the gateway 41 and an external communication network. The server 42 stores signals of the wireless controller 30 and the electronic appliance 21. The server 42 stores a signal transmitted from gateway 41.

The server 42 may further include a storage unit for storing signals of the wireless controller 30, the electronic appliance 21 and the gateway 41.

The server 42 may is connected to the wireless controller 30 through a cloud network as an external network, such that the server 42 may control the electronic appliance 21 in a home.

As shown in FIG. 2, the gateway 41 of the gateway system 40 includes a communication module 400 communicating with the gateway module 500, the wireless controller 30 and the electronic appliance 21 to transceive a control signal.

As shown in FIG. 3, the communication module 400 may be configured in a detachable type, such that the communication module 400 may be fixedly inserted into a connector 511 of the gateway module 500 to transfer a control signal.

The gateway module 500 may include at least one connector 511 into which a plurality of pins of an interface unit 450 of the communication module 400 are fixedly inserted.

As shown in FIG. 3, the connector 511 may protrude and may be connected to a control unit of the gateway module 500.

As described above, the communication module 400 of the gateway 41 may be detachably coupled to the gateway module 500 such that the gateway module 500 may support any additional wireless schemes as well as the wireless schemes supported by the gateway module 500 for itself.

That is, when the gateway module 500 supports ZigBee and WiFi schemes, the communication module 400 supporting Bluetooth scheme may be combined with the gateway module 500, such that the gateway module 500 may communicate with the electronic appliance 21 and the wireless controller 30.

The wireless controller 30, which serves as an input unit for inputting a user command, transmits a control signal according to the user command to a communication module 400 through a wireless network.

The wireless controller 300 may include a remote controller or a smart phone.

The wireless network between the wireless controller 30 and the communication module 400 may be determined according to wireless environments.

A network, such as WiFi, ZigBee, Z-wave or Bluetooth, may be applied for a wireless control.

The wireless controller 30 may be configured as shown in FIG. 4.

Referring to FIG. 4, the wireless controller 30 includes a mode switching part 301, a memory part 303, a power/charging part 305, a control part 307, and a transmission/reception part 309.

The mode switching part 301 performs the switching of an operating mode. For example, the mode switching part 301 may perform the switching to the electronic appliance control while performing the typical function of the remote controller.

The memory part 303 may store operation and communication control programs/protocols.

The power/charging part 305 charges power to the wireless controller 30 and supplies power for operating the wireless controller 30.

The transmission/reception part 309 transmits the user command, which is provided from the control part 307, to the communication module 400 of the gateway 41 through a preset wireless network.

The control part 307 controls the operations of the mode switching part 301, the power/charging part 305, and the transmission/reception part 309 by using the data stored in the memory part 303.

The communication module 400 may be configured as shown in FIG. 5.

The communication module 400 includes one housing 411 or 431. The housing 411 or 431 may be provided therein with an antenna part 410, a wireless communication part 430 and an interface part 450 which are formed in one unit.

The antenna part 410 receives the control signal transmitted from the wireless controller 30 and the electronic appliance 21 through the wireless network.

The wireless communication part 430 receives the control signal from the antenna part 410, and generates a plurality of output signals to be transmitted to the gateway module 500 according to the control signal.

The wireless communication module 430 includes a communication integrated circuit 435 to analyze the control signal of the antenna part 410 according to the types of the wireless network.

In other words, the communication module 400 selects the communication integrated circuit 435 according to the predetermined wireless network environment to install the communication integrated circuit 435 therein.

The communication integrated circuit 435 may support at least one of ZigBee, Z-wave, WiFi, and Bluetooth communication schemes.

The interface part 450 includes the plurality of pins 452a, 452b, 454a, 454b and 454c corresponding to a plurality of output signals output from the wireless communication part 430.

As shown in FIG. 5, five pins 452a, 452b, 454a, 454b and 454c may be provided, but the embodiment is not limited thereto.

The interface parts 450 and 510 of the communication module 400 and the interface of the gateway module 500 may set the output signals of the pins 452a, 452b, 454a, 454b and 454c according to a control scheme.

The configurations of each pin 452a, 452b, 454a, 454b and 454c according to the control scheme will be described in detail below.

Hereinafter, the configuration of a detachable-type communication module 400 fixedly inserted into the gateway module 500 will be described with reference to FIGS. 6 to 8.

Figure 6:
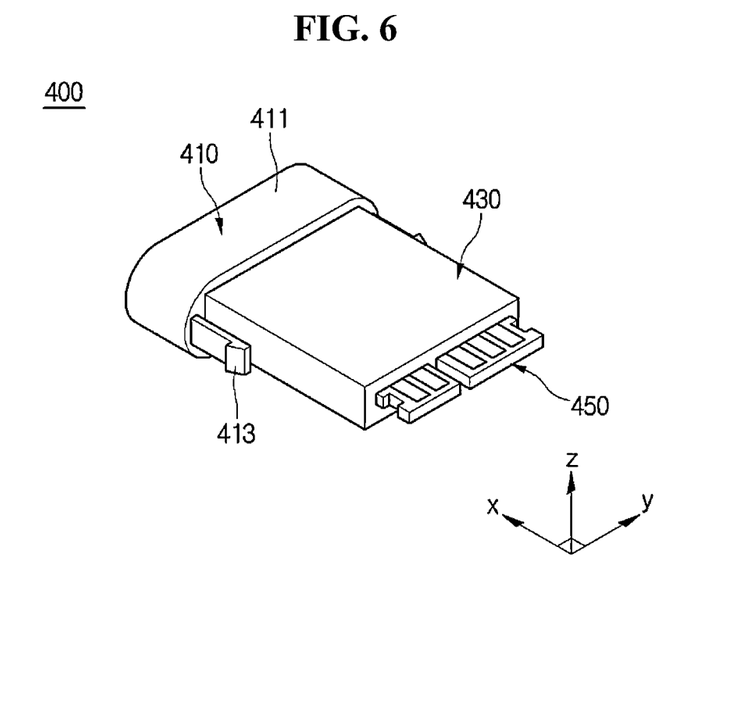
FIG. 6 is a perspective view showing the communication module of FIG. 5.

FIG. 6 is a perspective view showing the communication module of FIG. 1. FIGS. 7A and 7B are top and side views showing the communication module of FIG. 6. FIG. 8 is a top view showing a printed circuit board inside the communication module of FIG. 6.

Figure 7:
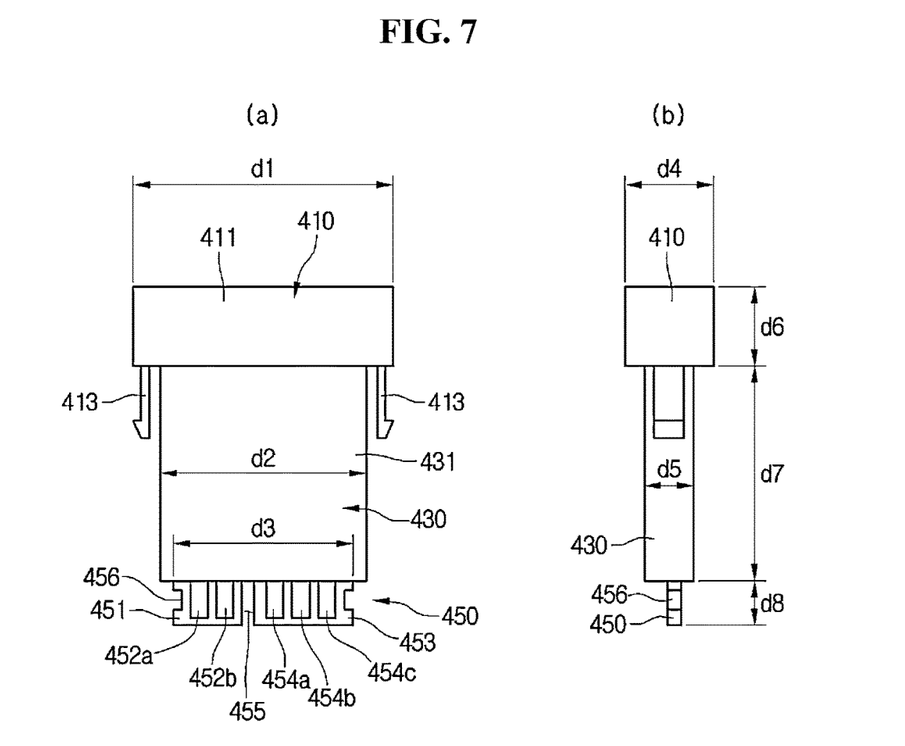
FIGS. 7A and 7B are top and side views showing the communication module of FIG. 6.
Figure 8:
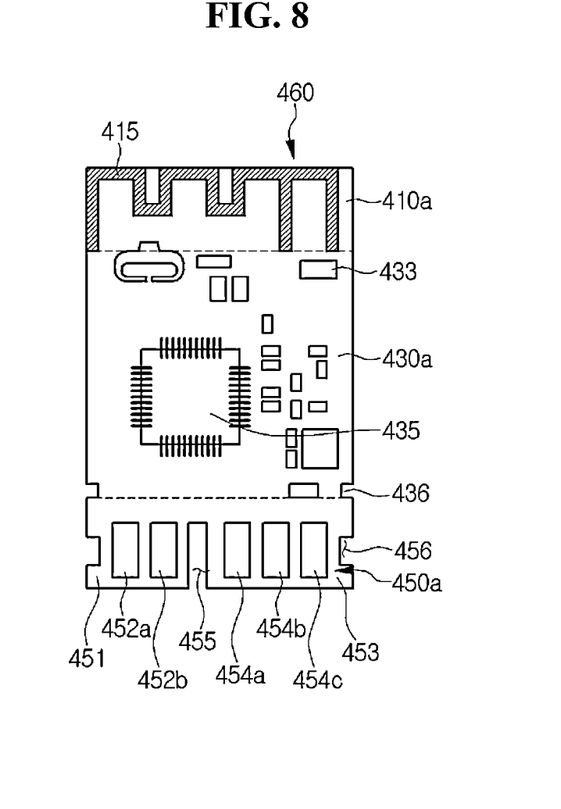
FIG. 8 is a top view showing a printed circuit board inside the communication module of FIG. 6.

Referring to FIGS. 6 to 8, the communication module 400 according to the embodiment includes a printed circuit board into which the antenna part 410, the wireless communication part 430, and the interface part 450 are integrated, and housings 411 and 431 to receive a portion of the printed circuit board.

As shown in FIG. 6, in the housings 411 and 431, a region corresponding to the interface part 450 protrudes outward to receive the printed circuit board.

The housings 411 and 431 include a first receiving part 411 to receive the antenna part 410 and a second receiving part 431 protruding in the first direction (x axis) from the first receiving part 411 and receiving the wireless communication part 430.

The first and second receiving parts 411 and 431 may be provided in one body. The first and second receiving parts 411 and 431 may be an assembly in which the upper body and the lower body are coupled with each other in a second direction (z axis) perpendicular to the first direction (x axis).

The housings 411 and 431 may include an insulating material. Preferably, the housings 411 and 431 may include plastic, such as polyimide, that is rigid.

The first receiving part 411 is provided therein with a space to receive the antenna part 410 of the printed circuit board, and has a rectangular shape having a long length in the third direction (y axis).

The first receiving part 411 may have a first width d1 of 20 mm to 25 mm, preferably, the first width d1 of 22 mm in the third direction (y axis), and may have a width d6 of 6 mm to 7 mm, preferably, the width d6 of 6.4 mm to 6.5 mm in the first direction (x axis). In addition, the first receiving part 411 has the height d4 of 7 mm to 8 mm, preferably, the length d4 of 7.7 mm in the second direction (z axis).

The side of the first receiving part 411 may be chamfered in such a manner that the side has a predetermined curvature.

The printed circuit board inserted into the space of the first receiving part 411 includes an antenna region corresponding to the antenna part 410.

An antenna region 410a is formed at one end of the printed circuit board as shown in FIG. 8, and includes an antenna pattern 415 formed on the support substrate 432 through the patterning process.

The antenna pattern 415 may have a planar inverted F antenna (PIFA), but the embodiment is not limited thereto.

In other words, the antenna pattern 415 may be realized in the shape of a monopole antenna, or the shape of a dipole antenna.

The antenna region 410a may include the support substrate 432 serving as a dielectric body of the antenna, the antenna pattern 415 formed on the support substrate 432, a ground layer (not shown) under the substrate 432, and a matching pattern (not shown) formed inside or outside the dielectric body 432.

The antenna part 410 is provided to transmit/receive a signal having a preset frequency band. In other words, the antenna pattern 415 makes resonance at the frequency band to allow a signal to pass therethrough. The antenna pattern 415 makes resonance at the predetermined reference impedance.

The antenna pattern 415 is provided adjacent to the ground layer, and has one end serving as a feeding point. In this case, the feeding point may extend to the bottom surface of the support substrate 432 through the support substrate 432 serving as the dielectric body. In addition, the antenna pattern 415 may include at least one horizontal component circuit and at least one vertical component circuit distinguished from each other by at least one bending part.

For example, the antenna pattern 415 may be prepared in the form of a transmission circuit corresponding to at least one of a meander type, a spiral type, a step type, and a loop type.

A ground layer is provided to ground an antenna pattern 415.

The internal or external matching pattern is provided in order to match the impedance of the antenna pattern 415 with reference impedance.

As described, the antenna part 410 is provided in the form of a plate, so that the antenna part 410 may be integrated in the small-size communication module 400.

The antenna pattern 415 may include a conductive material or a material containing metal such as copper (Cu), aluminum (Al), nickel (Ni), or molybdenum (Mo).

Meanwhile, the second receiving part 431 protruding in the first direction (x axis) from the first receiving part 411 may have a width d2 of 17 mm to 18 mm, preferably, the width d2 of 17.4 mm to 17.5 mm in the third direction (y axis). In addition, the second receiving part 431 may have a width d7 of 18 mm to 19 mm, preferably, the width d7 of 18 mm to 18.2 mm in the first direction (x axis). In addition, the height d5 of the second receiving part 431 in the second direction (z axis) may be in the range of 4.5 mm to 5.2 mm, preferably, 5 mm.

Since the second receiving part 431 has the width d2 narrower than the width of the first receiving part 411 in the third direction (y axis) as described above, a predetermined dummy space is formed at the lateral side of the first receiving part 411. In addition, since the second receiving part 431 has a height d5 lower than that of the first receiving part 411, the second receiving part 431 may be formed with a step difference from the first receiving part 411.

The second receiving part 431 has the shape of a cylinder having a space to receive the wireless communication part 430 of the printed circuit board therein. The second receiving part 431 may have a rectangular shape as shown in FIG. 6.

A fixing part 413 is formed in the space formed at the lateral side of the first receiving part 411.

As shown in FIG. 6, the fixing part 413 is formed in the dummy space resulting from the difference in an area between the first and second receiving parts 411 and 431, and protrudes in the first direction (x axis) from the lateral side of the first receiving part 411.

Since the fixing part 413 is integrally formed with a body of the housing 411 or 431 and provided at one end thereof with a triangular protrusion, the fixing part 413 is locked with the lighting module 500 when being inserted into the lighting module 500, so that the fixing strength may be improved.

Fixing parts 413 may be formed at both lateral sides of the second receiving part 431, and the triangular protrusions of the fixing parts 413 may be provided in opposition to each other so that the triangular protrusions are directed outward.

Meanwhile, as shown in FIG. 8, a plurality of devices are mounted in a module region 430a of the printed circuit board corresponding to the wireless communication part 430 inserted into the second receiving part 431.

The module region 430a has a wireless integrated circuit 435 installed therein in order to make communication with the wireless control module 300, and the wireless integrated circuit 435 may selectively employ one of ZigBee, WiFi, Z-wave, and Bluetooth wireless integrated circuits according to the wireless environment. In this case, the passive devices and the circuit configurations of a peripheral part of the wireless integrated circuit 435 may be varied according to the types of the wireless integrated circuit 435.

A connection pattern 433 may be formed at the boundary region between the module region 430a and the antenna region 410a for the purpose of connection with an external antenna.

A recess part 436 is formed at the boundary region between the module region 430a and a terminal region 450a to fix the housing 411 or 431 to the printed circuit board. The recess part 436 is coupled with the protrusion formed on the inner surface of the housing 411 or 431.

The terminal region 450a of the printed circuit board corresponding to the interface part 450 protruding from the end portion of the second receiving part 431 of the housings 411 and 431 includes the pins 452a, 452b, 454a, 454b and 454c as shown in FIG. 6.

The terminal region 450a may have the length d8 of 3.5 mm to 4.0 mm in the first direction (x axis) from the end portion of the housing 411 or 431, and may have the width d3 of 15 mm in the third direction (y axis).

The terminal region 450a includes the pins 452a, 452b, 454a, 454b and 454c on the support substrate 432, and the pins 452a, 452b, 454a, 454b and 454c may include five pins 452a, 452b, 454a, 454b and 454c, but the embodiment is not limited thereto.

If the five pins 452a, 452b, 454a, 454b, and 454c are provided as described above, the five pins 452a, 452b, 454a, 454b, and 454c are grouped into several groups, and the terminal region 450a includes a recess part 455 obtained by removing the support substrate 432 between the grouped pins.

The group of the pins 452a and 452b provided at the left side of the recess part 455 is defined as a first pin part 451, and the group of the pins 454a, 454b, and 454c provided at the right side of the recess part 455 is defined as a second pin part 453.

The number of pins 452a, 452b, 454a, 454b and 454c of the first pin part 451 is different from that of pins of the second pin part 453.

When the terminal region 450a includes the five pins 452a, 452b, 454a, 454b and 454c, the first pin part 451 may include two pins 452a and 452b, and the second pin part 453 may include three pins 454a, 454b and 454c.

The pins 452a, 452b, 454a, 454b, and 454c are grouped into several groups in such a manner that the groups have the different numbers of pins, so the front surface of the communication module 400 is distinguished from the rear surface of the communication module 400.

In addition, the recess part 455 is formed between the first and second pin parts 451 and 453, thereby inhibiting the pins 452a, 452b, 454a, 454b, and 454c of the first and second pin parts 451 and 453 from interfering with each other.

The width of the recess part 455 may be equal to or greater than 0.9 mm, and the pins 452a, 452b, 454a, 454b, and 454c may be spaced apart from each other by the interval of 0.8 mm or less, but the embodiment is not limited thereto.

A protrusion (not shown) protruding from the support substrate 432 may be additionally provided in the boundary region between the first and second pin parts 451 and 453.

Meanwhile, the terminal region 450a includes locking grooves 456 recessed in the concave shape from both lateral sides.

Although each locking groove 456 may be formed in a dummy region of the edge region without the pins 452a, 452b, 454a, 454b, and 454c as shown in FIG. 8, the locking groove 456 may be formed by removing portions of the pins 452a, 452b, 454a, 454b, and 454c as shown in FIG. 8.

The locking groove 456 is coupled with the internal protrusion (not shown) of the connector 511 when the terminal region 450a is inserted into the connector 511 of the lighting module 500, so that the coupling strength can be improved.

The printed circuit board constituting one communication module 400 may have a circuit pattern varied according to the type of the wireless integrated circuit 435 and the control scheme of the gateway module 500.

Thus, when a plurality of printed circuit boards are formed according to the type of the wireless integrated circuit 435 and the control scheme, the communication module 400 may be constructed by selectively coupling the specific printed circuit board to the housing 411 or 431 of the communication module 400.

Hereinafter the configurations of the interface part 450 and the circuit of the module region 430a according to the control scheme will be described with reference to FIGS. 9 and 10.

Figure 9:
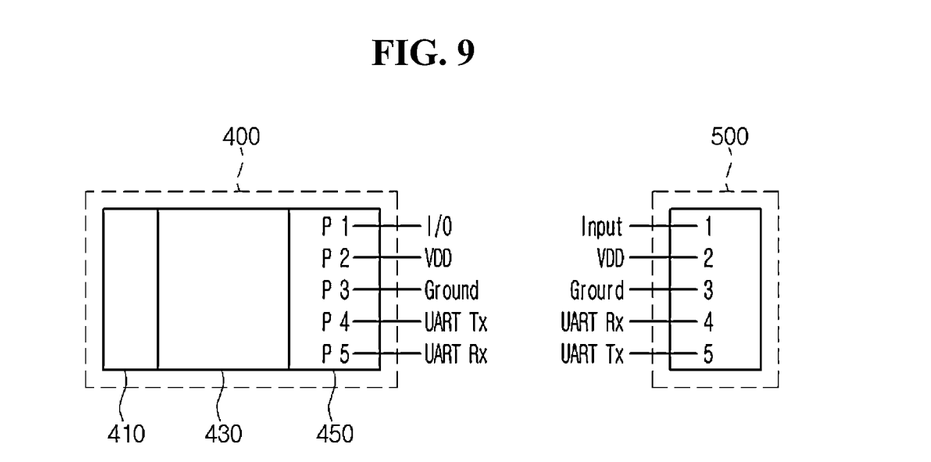
FIG. 9 is a view showing the correspondence between the interface part of the communication module and the gateway of FIG. 2.

FIG. 9 is a view showing the correspondence between the interface module 500 and the interface part 450 of the communication module 400 of FIG. 1. FIG. 10 is a circuit diagram showing the communication module 400 satisfying the correspondence of FIG. 9.

Hereinafter pins will be assigned with reference signs P1 to P5.

Referring to FIG. 9, when the interface part 450 of the communication module 400 includes the five pins P1 to P5, the pins P1 to P5 of the interface of the communication module 400 and the pins of the connector 511 of the gateway module 500 have output signals set as shown in FIG. 9.

That is, the first pin P1 outputs I/O signal informing of the attachment and detachment of the communication module 400, the second pin P2 receives reference voltage Vdd to drive the communication module 400, the third pin P3 receives a grounding voltage Ground, and the fourth and fifth pins P4 and P5 transmit and receive lighting control signals, respectively.

In other words, the first to third pins P1 to P3 are related to the reference voltage, and the fourth and fifth pins P4 and P5 are related to the control signal. The recess part 455 may be formed between the third and fourth pins P3 and P4.

The UART scheme may be employed as a control scheme between the gateway module 500 and the communication module 400.

Two pins are employed for the UART scheme. One of the pins is used for reception and the other is used for transmission.

Figure 10:
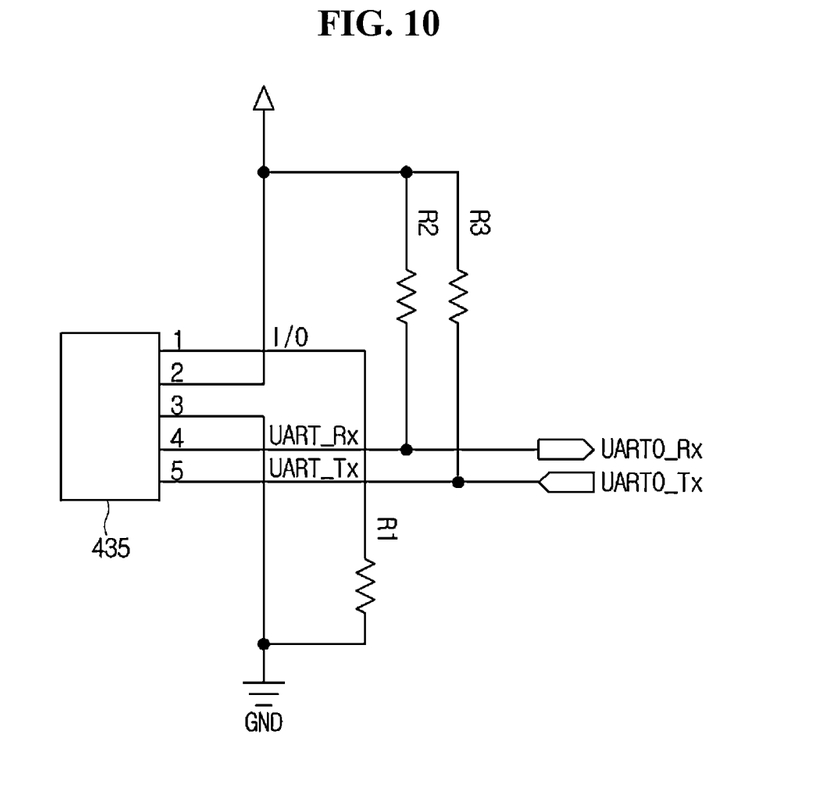
FIG. 10 is a circuit diagram showing the communication module 400 satisfying the correspondence of FIG. 9.

As described above, when the gateway module 500 performs the reception and transmission in the UART scheme, the I/O signal is set to a low state, the fourth pin P4 is set as a transmission pin, and the fifth pin P5 is set as a reception pin To this end, the printed circuit board includes a circuit shown in FIG. 10.

That is, the circuit is formed between five terminals of the wireless integrated circuit 435 and five pins P1 to P5 of the terminal region 450a. When the reference voltage and the grounding voltage are applied, the fourth and fifth pins P4 and P5 are connected to the reference voltage through pull-up resistors R2 and R3, respectively.

In this case, the first pin P1 for outputting the I/O signal is connected to the ground voltage through a pull-down resistor R1, so that the I/O signal is set to a low value.

Thus, if the communication module 400 is inserted into the gateway module 500 so that the low value is applied as the I/O signal, the gateway module 500 reads out the I/O signal of the low value so that the communication is connected to the gateway module 500.

Figure 11:
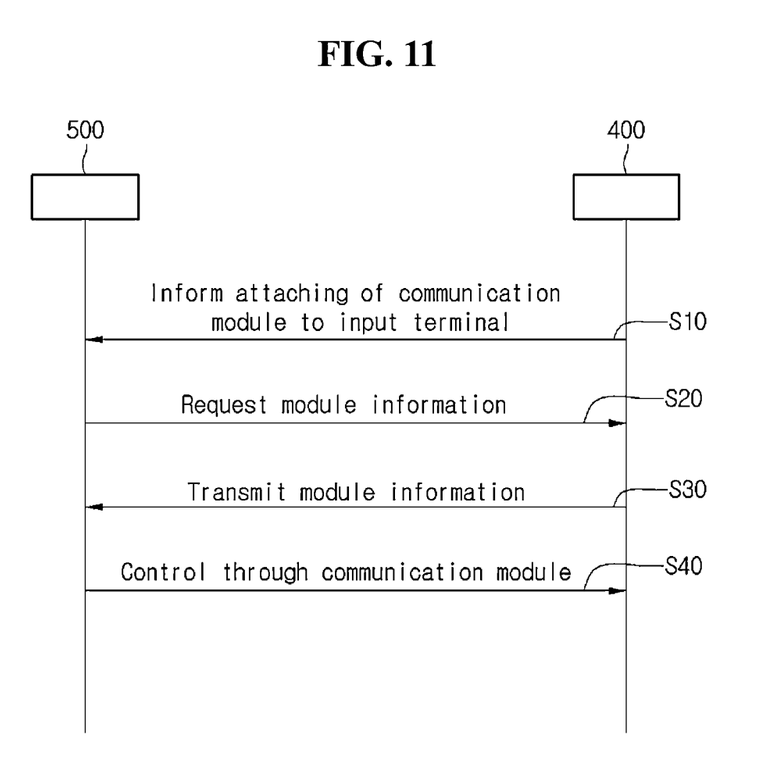
FIG. 11 is a flowchart illustrating an operation between the gateway and the communication module.

Hereinafter the control scheme between the gateway module 500 and the communication module 400 will be described with reference to FIG. 11.

First, when the communication module 400 is inserted into the gateway module 500 so that the low value is applied as the I/O signal, the gateway module 500 reads out the I/O signal of the low value.

While the first pin INPUT of the gateway module 500 maintains a high state, when the communication module is inserted into the gateway module 500 so that the I/O signal of the low value is input to the first pin INPUT, the value of the first pin INPUT is converted into the low value.

Therefore, in step S10, the communication module 400 informs the gateway module 500 of the coupling state of the communication module 400.

In step S20, the gateway module 500 requests the communication module 400 to send information on the corresponding communication module 400 when receiving the information.

The information on the corresponding communication module 400 may include a wireless communication scheme of the mounted wireless communication chip 435.

In step S30, when the communication module receives the request, the communication module transmits the information on the communication module.

When the gateway module 500 receives the information on the communication module, the gateway module 500 transmits the information on the communication module 400 to a server.

Then, in step S40, the gateway module 500 adds the wireless communication scheme provided from the inserted communication module 400 to the wireless communication schemes of the gateway module 500, such that the gateway module 500 communicates with an adjacent wireless controller or electronic appliance to controls apparatuses.

Thus, when a wireless communication schemes is requested except for the wireless communication schemes provided from the gateway module 500, the communication module 400 for providing the wireless communication scheme is inserted into the gateway module 500, so that the number of wireless communication schemes provided from the gateway 500 may be increased.

Since the communication scheme extends without entirely exchanging the gateway module 500, the cost may be reduced and an additional communication scheme may be added.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A gateway system comprising:
  a gateway interfacing data transmitted and received between a wireless controller and at least one electronic appliance by a first wireless communication scheme and having a connector connected to a control unit of the gateway, and
  a communication device configured to be inserted into the connector of the gateway in a detachable way and providing a second wireless communication scheme different from the first wireless communication scheme of the gateway;
  wherein the gateway is configured to:
  communicate the data between the wireless controller and the electronic appliance by the first wireless communication scheme prior to the insertion of the communication device into the connector,
  transmit a request signal of information for the communication device to the communication device if the communication device is inserted into the connector,
  receive the information transmitted from the communication device, and
  add the second wireless communication scheme provided by the inserted communication device to the first wireless communication scheme of the gateway, such that the gateway communicates with the wireless controller to control the electronic appliance;

wherein the information includes a wireless communication scheme of a wireless communication chip mounted in the communication device;

wherein the communication device comprises a housing provided therein with a space, and a module substrate disposed in the space of the housing and on which the wireless communication chip for providing the second wireless communication scheme is mounted;

wherein the module substrate comprises an antenna part, a communication module part to receive a control signal from the antenna part and to generate an output signal through the wireless communication chip, and an interface part to transmit the output signal;

wherein a recess part is formed on the interface part of the module substrate, wherein the interface part comprises:

a first pin part disposed at a first side of the recess part for a voltage signal; and a second pin part disposed at a second side of the recess part for a lighting control signal;

wherein the first pin part is spaced apart from the second pin part by the recess part, wherein the first pin part comprises:

a first pin outputting a signal indicating attachment and detachment of the communication device, a second pin receiving a reference voltage to drive the communication device, and a third pin receiving a ground voltage; and wherein the second pin part comprises:

a fourth pin transmitting the lighting control signal, and a fifth pi receiving the lighting control signal.

2. The gateway system of claim 1, wherein the gateway communicates with the wireless controller which transmits a control signal of the electronic appliance to the gateway through the first wireless communication scheme or the second wireless communication scheme.

3. The gateway system of claim 2, wherein the housing comprises:

a first receiving part to receive the antenna part; and a second receiving part to receive the communication module part, and wherein the interface part protrudes out of the housing.

4. The gateway system of claim 3, further comprising at least one fixing protrusion protruding from a lateral side of the first receiving part of the housing to fix the communication device.

5. The gateway system of claim 1, wherein the first and second wireless communication schemes employ mutually different communication schemes selected from a ZigBee communication scheme, a Z-wave communication scheme, a WiFi communication scheme, and a Bluetooth communication scheme.

6. The gateway system of claim 1, wherein the electronic appliance comprises at least one lighting apparatus.

* * * * *